J. PREUSS.
CLUTCH-OPERATING MECHANISM FOR AUTOMOBILES.
APPLICATION FILED JULY 21, 1911.

1,051,446.

Patented Jan. 28, 1913.

Witnesses:
C. E. Wessels.
B. J. Richards.

Inventor:
John Preuss,
By Joshua R. H. Potts
his Attorney.

UNITED STATES PATENT OFFICE.

JOHN PREUSS, OF CHICAGO, ILLINOIS.

CLUTCH-OPERATING MECHANISM FOR AUTOMOBILES.

1,051,446.                    Specification of Letters Patent.    Patented Jan. 28, 1913.

Application filed July 21, 1911.   Serial No. 639,709.

*To all whom it may concern:*

Be it known that I, JOHN PREUSS, a citizen of the United States, and a resident of the city of Chicago, county of Cook, and State of Illinois, have invented certain new and useful Improvements in Clutch-Operating Mechanism for Automobiles, of which the following is a specification.

My invention relates to improvements in clutch operating mechanism for automobiles and has for its object the production of means for insuring the stopping of the engine upon application of the brakes.

The invention consists in the combinations and arrangements of parts hereinafter described and claimed.

Figure 1:
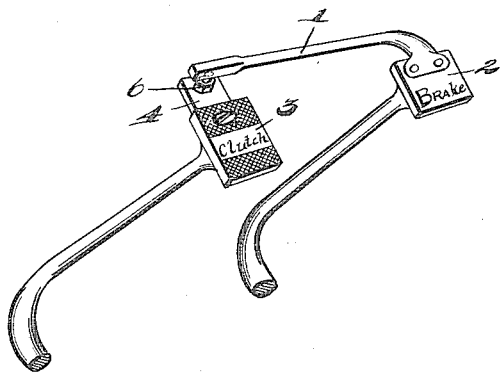
Figure 2:
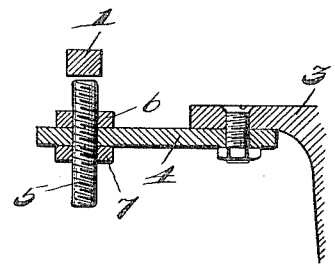

The invention will be best understood by reference to the accompanying drawing forming a part of this specification, and in which, Figure 1 is a perspective view of the brake and clutch pedals of an automobile equipped with means embodying my invention, and Fig. 2, an enlarged detail section illustrating the connection between the brake and clutch pedals.

The preferred form of construction as illustrated in Figs. 1 and 2 comprises an angular arm 1 secured to the brake pedal 2 of an automobile. The clutch pedal 3 of the automobile is provided with a forwardly extending arm 4 carrying a set screw 5 which is provided with lock nuts 6 and 7 arranged above and below arm 4 and is set so as to contact with the under side of arm 1. By this arrangement it will be observed that upon operation of brake pedal 2 to apply the brakes of the automobile arm 1 will contact with set screw 5 and thus operate clutch pedal 3 to throw the clutch out of connection and thus disconnect the engine from the driving wheel of the automobile. This will prevent the load of the brakes being applied to the engine which usually will stop the engine. By adjustments of set screw 5 any slight slack in the brake mechanism may be provided for or adjustments of the brake mechanism provided for. The arm 1 is set out of the path of the foot of the operator on clutch pedal 3 so that the clutch may be operated if desired without affecting the brake.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having described my invention what I claim as new and desire to secure by Letters Patent is:

The combination with the brake and clutch pedals of an automobile arranged adjoining each other, of a laterally extending arm carried by the brake pedal; and a set screw carried by the clutch pedal and contacting with the under side of said arm, substantially as described.

In testimony whereof I have signed my name to this specification in the presence of two subscribing witnesses.

his
JOHN × PREUSS.
mark

Witnesses:
JOHN A. REY,
JOSHUA R. H. POTTS.